United States Patent [19]

Barton et al.

[11] Patent Number: 5,730,465
[45] Date of Patent: Mar. 24, 1998

[54] ADJUSTABLE VEHICLE STEERING COLUMN CLAMPING MECHANISM

[75] Inventors: Laurence George Barton; Michael Thomas Hancock, both of Warwickshire, England

[73] Assignee: Nastech Europe Limited, Coventry, England

[21] Appl. No.: 709,969

[22] Filed: Sep. 9, 1996

[30] Foreign Application Priority Data

Sep. 11, 1995 [GB] United Kingdom ............... 9518520
Dec. 15, 1995 [GB] United Kingdom ............... 9525669

[51] Int. Cl.⁶ .................................................. B62D 1/18
[52] U.S. Cl. ....................................... 280/775; 74/493
[58] Field of Search ............................ 280/775; 74/493

[56] References Cited

U.S. PATENT DOCUMENTS

| | | | |
|---|---|---|---|
| 4,915,412 | 4/1990 | Yuzuriha et al. | 280/775 |
| 5,199,319 | 4/1993 | Fujiu | 74/493 |
| 5,286,056 | 2/1994 | Speich | 280/775 |
| 5,481,938 | 1/1996 | Stuedemann et al. | 74/493 |

FOREIGN PATENT DOCUMENTS

| | | |
|---|---|---|
| 0066308 | 12/1982 | European Pat. Off. |
| 600700 A1 | 6/1994 | European Pat. Off. |
| 2279728 | 1/1995 | United Kingdom |
| 2295445 | 5/1996 | United Kingdom |

*Primary Examiner*—Kenneth R. Rice
*Attorney, Agent, or Firm*—Michael H. Minns

[57] ABSTRACT

An adjustable vehicle steering column clamping mechanism for a rake and reach adjustable steering column includes a steering column support bracket which has two flanks extending on either side of a steering column outer tube, each flank incorporating a slot to permit rake adjustment. A reach adjustment bracket has two flanks which extend on either side of the tube and lie adjacent the flanks of the bracket, the flanks also having slots extending parallel to the tube axis for reach adjustment. The flanks are spaced from the tube so as to accept heads of clamping bolts operated by a handle acting on associated clamping parts mounted on the bolts. The arrangement enables the bolts to be located on a substantially on-center line passing at right angles through the axis of the steering column.

18 Claims, 3 Drawing Sheets

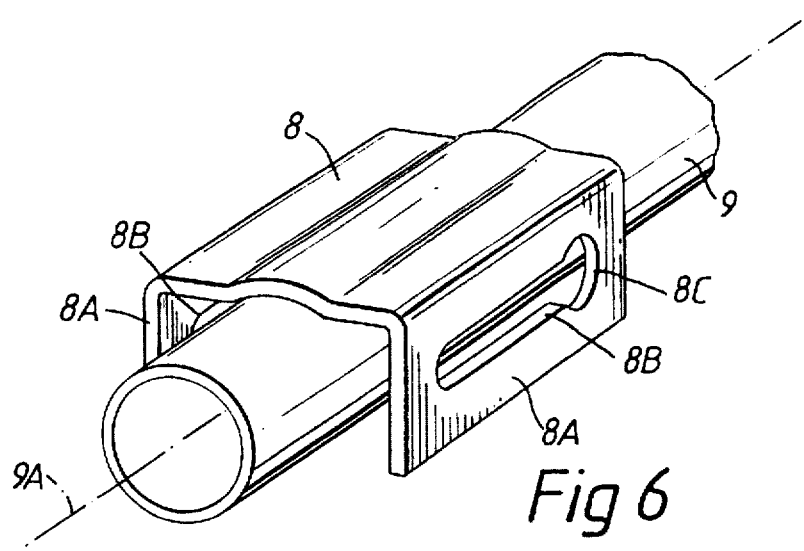
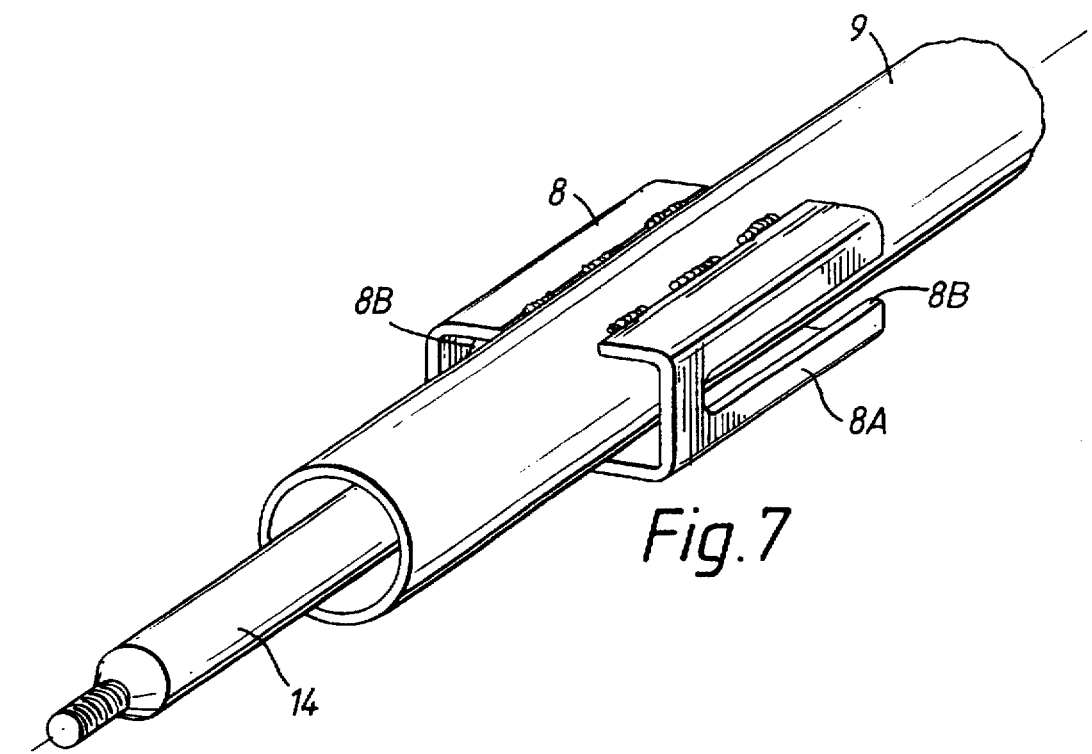

ADJUSTABLE VEHICLE STEERING COLUMN CLAMPING MECHANISM

BACKGROUND OF THE INVENTION

This invention relates to an adjustable vehicle steering column clamping mechanism.

In known adjustable vehicle steering column clamping mechanisms, a steering column outer tube is supported in a bracket with slots in it to permit rake or vertical adjustment of the steering column and steering wheel and other slotted parts are provided to permit reach or axial adjustment of the steering column. In these known constructions, a clamping mechanism is provided with a clamping handle, the mechanism including a bolt rotatable by the clamping handle, the bolt extending between two flanks of the support bracket on either side of the steering column outer tube and the clamping mechanism clamp and release the steering column outer tube relative to the support bracket and the parts for reach adjustment.

It will be appreciated that for the bolt to extend between the embracing flanks of the steering column outer tube, the bolt must pass either under or over the steering column outer tube, which therefore takes up space. In addition, in certain circumstances, uneven clamping effort is obtained with such an under or over arrangement of bolt clamping mechanism, with the bolt clamping pressure acting only from one side.

The foregoing illustrates limitations known to exist in present adjustable vehicle steering column clamping mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adjustable steering column clamping mechanism comprising: a steering column support bracket having two opposed slots therein; an adjustment bracket connected to a steering column tube, the adjustment bracket having two slots therein, the slots being positioned proximate radially opposing portions of the steering column tube; a clamping mechanism operating handle having two bolt engaging portions extending therefrom; and two bolts, one bolt slidably engaging one adjustment bracket slot, extending through one steering column support bracket slot and threadedly engaging one clamping mechanism operating handle bolt engaging portion, the other bolt slidably engaging the other adjustment bracket slot, extending through the other steering column support bracket slot and threadedly engaging the other clamping mechanism operating handle bolt engaging portion; the clamping mechanism operating handle being operable from a clamped condition wherein the steering column support bracket is clamped between the adjustment bracket and the bolt engaging portions of the clamping mechanism operating handle, to an unclamped condition wherein the steering column support bracket is moveable relative to the adjustment bracket and the bolt engaging portions of the clamping mechanism operating handle.

The foregoing and other aspects will become apparent from the following detailed description of the invention when considered in conjunction with the accompanying drawing figures.

BRIEF DESCRIPTION OF THE DRAWING FIGURES

FIGS. 3, 4, 5, 6 and 7 are alternate embodiments of the reach adjustment bracket means.

DETAILED DESCRIPTION

According to the present invention, there is provided an adjustable vehicle steering column clamping mechanism including a steering column support bracket with two flanks for extending either side of a steering column outer tube, each flank incorporating a slot for adjustment of a steering column in a rake direction, and a reach adjustment bracket means arranged to be joined to the steering column outer tube, the reach adjustment bracket means having two flanks for extending either side of the steering column outer tube, each flank of the reach adjustment bracket incorporating a slot for adjustment of the steering column in the reach direction; there being a clamping mechanism operating handle with parts extending to embrace the flanks on both sides of the steering column outer tube, and threaded bolts and associated clamping members on the bolts rotatable by said operating handle parts; one of the bolts extending through the slots in the flanks of the two brackets on one side of the steering column outer tube and the other bolt extending through the slots of the two brackets on the other side of the steering column outer tube; the arrangement being such that rotation of the handle in one direction moves said parts in a direction to clamp the brackets and steering column outer tube and rotation of the handle in the opposite direction moves said parts in a direction to release the brackets and steering column outer tube, thereby to facilitate adjustment of the steering column.

It will be appreciated that with such an arrangement the bolts need not cross over or under the steering column but can be located on a substantially on-center line passing at right angles through the axis of the steering column.

In a preferred embodiment, the respective flanks of the steering column support bracket extend outside the flanks of the reach adjustment bracket means.

The innermost flanks can be spaced from the steering column outer tube so that a head of each bolt can lie between the inner side of the respective innermost flank and the outer side of the steering column outer tube.

The slots in the flanks of the reach adjustment bracket means can be provided with a keyhole portion through which the head of a respective bolt can pass so as to be located on the inner side of the flank.

In one embodiment, each bolt can be given both a left-hand and a right-hand thread. In an alternate embodiment, one bolt has a left-hand thread and the other bolt has a right-hand thread. The threads can be multi-start threads.

The reach adjustment bracket can be joined to the steering column outer tube by welding and the reach adjustment bracket means can be pressed, cast or extruded.

Figure 1:
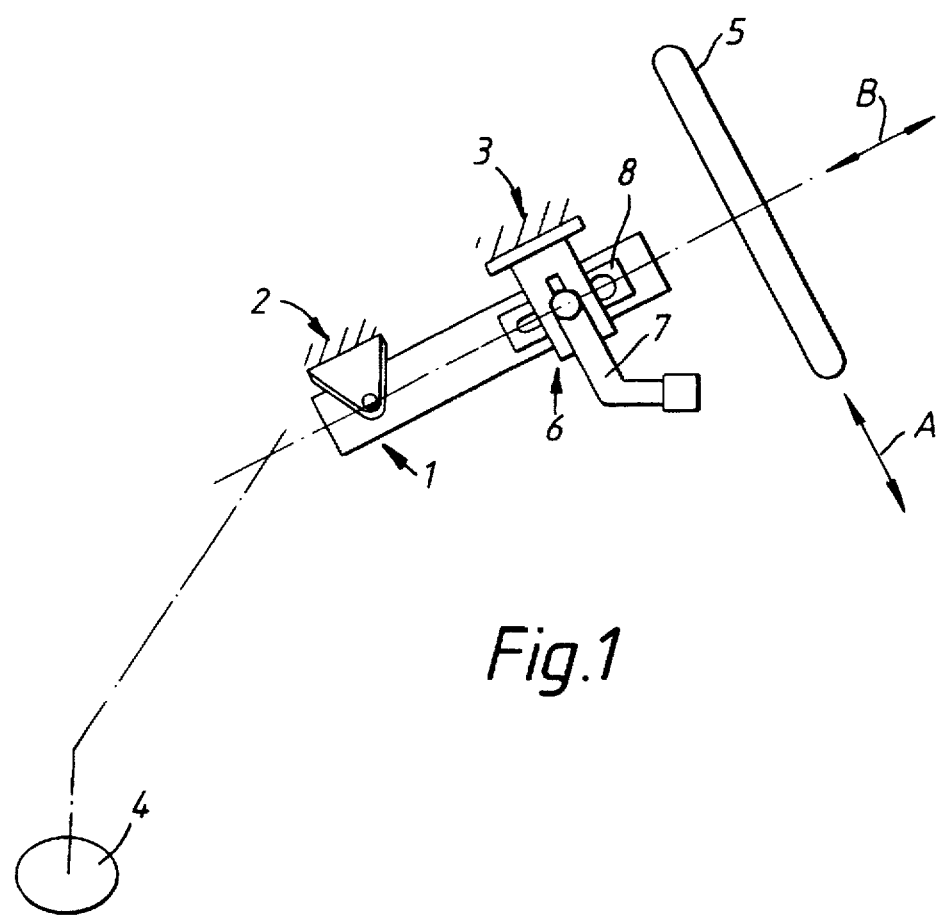
FIG. 1 is a schematic view showing an adjustable vehicle steering column including a clamping mechanism.

FIG. 1 shows an adjustable vehicle steering column 1 secured by brackets 2 and 3 and connected to a steering column rack 4. A steering wheel 5 is illustrated and the double arrow A illustrates the direction of possible vertical or rake adjustment of the steering wheel 5 and the double arrow B illustrates the direction of axial or reach adjustment thereof.

A steering column clamping mechanism 6 includes an operating clamp handle 7 with the mechanism acting on the support bracket 3, which is also provided for rake adjustment, and a reach adjustment bracket means 8.

The steering column support bracket 3 has two flanks 3A extending either side of a steering column outer tube 9, each flank 3A incorporating a slot 3B to permit rake adjustment of the steering column 1.

The reach adjustment bracket means 8 can take various forms but in each case it is provided with two flanks 8A which extend on respective sides of the steering column outer tube 9 and lie adjacent the respective flanks 3B of the support bracket 3.

In the embodiment illustrated, it is intended that the flanks 8A of the bracket means 8 lie inside the flanks 3B of the support bracket 3 and are spaced a sufficient distance from the outer surface of the steering column outer tube 9 to accommodate heads 10A of respective clamping bolts 10.

Figure 2:
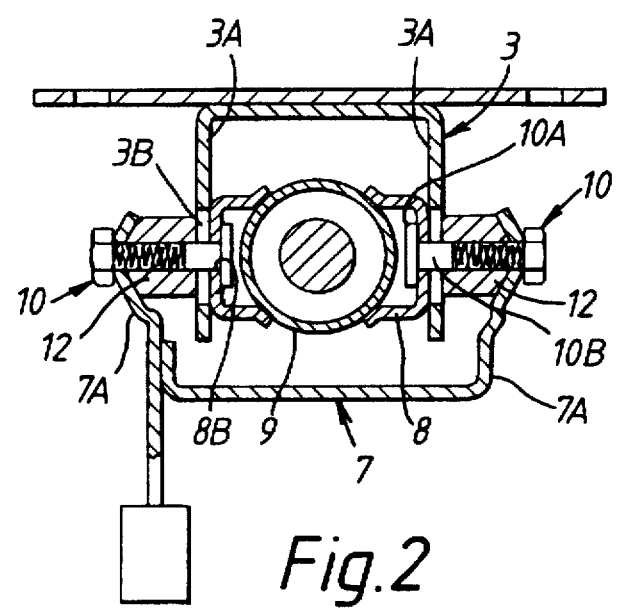
FIG. 2 is a diagrammatic sectional view of the adjustable vehicle steering column clamping mechanism of FIG. 1.
Figure 3:
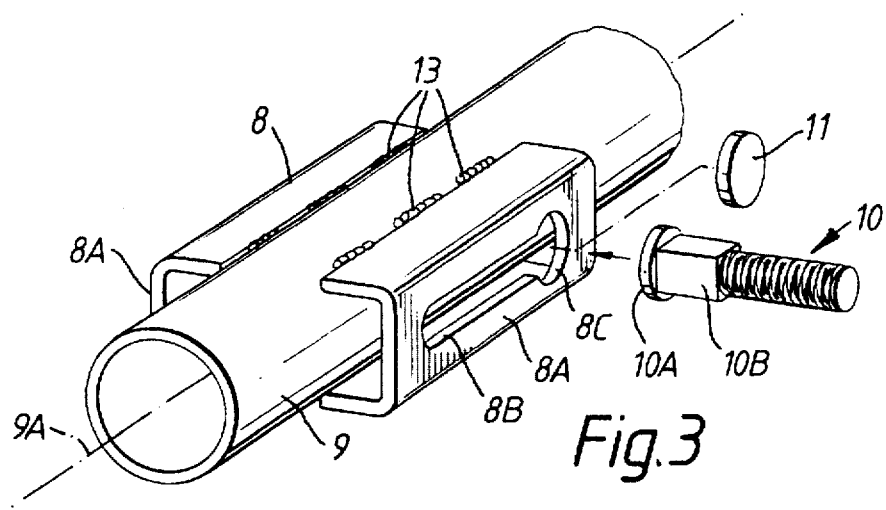

Each flank 8A of the reach adjustment bracket means 8 is provided with a slot 8B extending parallel to the axis 9A of the steering column outer tube 1 and, in the form illustrated, these slots 8B are aligned with each other and with the axis 9A of the steering column outer tube 9. However, it is to be understood that the line of the slots 8B could be somewhat above or below the axis 9A. The slots 8B in the flanks 8A are each provided with a keyhole 8C to permit admission of the respective heads 10A of the two locking bolts 10, as illustrated in FIGS. 2 and 3. Once the heads 10A of the bolts 10 have been inserted, the keyholes 8C can be plugged by plugs such as the one in illustrated at 11 to prevent subsequent disengagement of the bolts 10.

As intimated, the locking bolts 10 form part of the clamping mechanism and can be provided with squared rubbing surfaces as illustrated at 10B in FIG. 3, these rubbing surfaces running along the edges of the slot 8B. These rubbing surfaces could be circular instead of square.

Each bolt 10 is provided with a left-hand and a right-hand thread and the threads can be multi-start threads. Mounted on the threads are parts of the clamping mechanism operating handle 7 which extend to embrace the flanks 3A and 8A on both sides of the outer tube 9.

It will be noted that the parts 7A of the operating handle 7 are mounted in threaded relationship on the locking bolts 10, each part 7A embracing an inner cone 12 associated with a clamping nut threaded on the bolt 10.

Rotation of the operating handle 7 rotates the clamping nuts on the bolts 10 in opposite senses on the threads so that the parts 7A are drawn towards one another to cause the clamping nuts to clamp the two bracket 3 and 8 together to inhibit steering column adjustment. In the opposite direction of rotation, of the operating handle 7, the parts 7A are urged in the opposite sense to unclamp the two brackets to permit adjustment.

Upon assembly of the clamping mechanism, the various components are mounted in a matched sense to obtain equal clamping effort on both sides of the steering column.

Various embodiments of reach adjustment bracket means (8) are illustrated.

In FIGS. 2 and 3, the reach adjustment bracket means 8 is in fact in two separate parts and can be formed by pressing, with the parts constituting the flanks 8A being spaced from the outer tube 9 and forming the bases of U-shaped parts, edges of which being welded at 13 for example to the outer tube 9.

Figure 4:
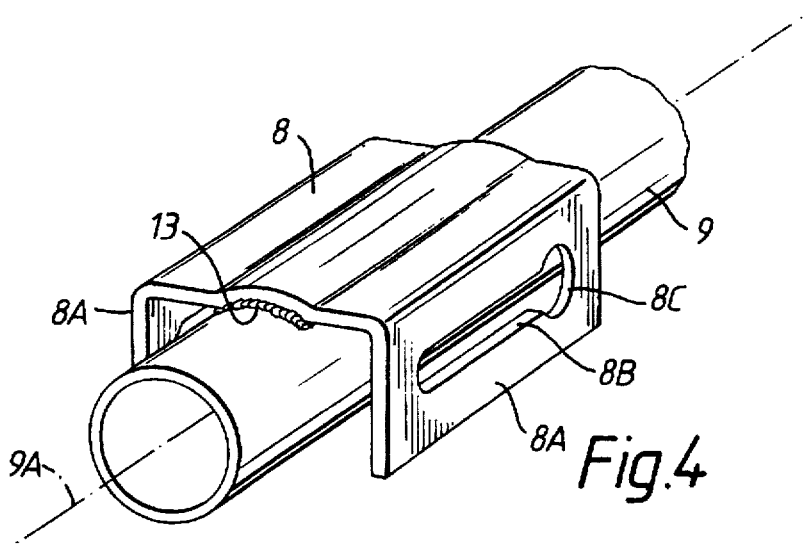

FIG. 4 shows the reach adjustment bracket means 8 in the form of a saddle bracket straddling the outer tube 9 and again the bracket 8 can be pressed and then welded to the tube 9.

Figure 5:
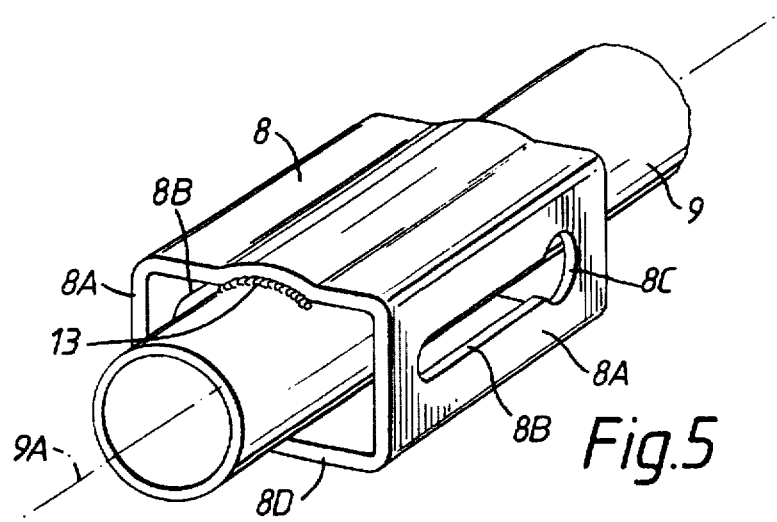

FIG. 5 is similar to FIG. 4 but shows that the two flanks 8A can be joined at their lower edges by a lower plate 8D extending below the outer tube 9. In this case, the outer tube can be a drawn tube and again the reach adjustment bracket is welded to it.

FIG. 6 illustrates an embodiment similar to FIG. 4 except that the unit can be cast or extruded. FIG. 7 illustrates an embodiment similar to the FIG. 3 embodiment except that keyhole slots are not provided but instead the slots 8B in the flanks 8A are open to the respective ends of the flanks 8A that are remote from the steering wheel end 14 of the steering column. This version can be applied to any of the embodiments discussed above to give an easier assembly capability.

Having described the invention, what is claimed is:

1. An adjustable steering column clamping mechanism comprising:

a steering column support bracket having two opposed slots therein;

an adjustment bracket connected to a steering column tube, the adjustment bracket having two slots therein, the slots being positioned proximate radially opposing portions of the steering column tube;

a clamping mechanism operating handle having two bolt engaging portions extending therefrom; and two bolts, one bolt slidably engaging one adjustment bracket slot, extending through one steering column support bracket slot and threadedly engaging one clamping mechanism operating handle bolt engaging portion, the other bolt slidably engaging the other adjustment bracket slot, extending through the other steering column support bracket slot and threadedly engaging the other clamping mechanism operating handle bolt engaging portion;

the clamping mechanism operating handle being operable from a clamped condition wherein the steering column support bracket is clamped between the adjustment bracket and the bolt engaging portions of the clamping mechanism operating handle, to an unclamped condition wherein the steering column support bracket is moveable relative to the adjustment bracket and the bolt engaging portions of the clamping mechanism operating handle.

2. The adjustable steering column clamping mechanism according to claim 1, wherein the steering column support bracket has two flanks extending on either side of the steering column tube, one slot being positioned in each flank.

3. The adjustable steering column clamping mechanism according to claim 1, wherein the adjustment bracket has two flanks extending on either side of the steering column tube, one slot being positioned in each flank.

4. The adjustable steering column clamping mechanism according to claim 3, wherein the adjustment bracket flanks are spaced from the steering column tube and a head of each bolt is between an inner side of a flank and the steering column tube.

5. The adjustable steering column clamping mechanism according to claim 1, wherein the steering column support bracket has two flanks extending on either side of the steering column tube, one steering column support bracket slot being positioned in each steering column support bracket flank; and the adjustment bracket has two flanks extending on either side of the steering column tube, one adjustment bracket slot being positioned in each adjustment bracket flank, the steering column support bracket flanks being positioned between the adjustment bracket flanks and the clamping mechanism operating handle bolt engaging portions.

6. The adjustable steering column clamping mechanism according to claim 1, wherein the adjustment bracket slots and the steering column support bracket slots each have a keyhole portion through which a head of each bolt can pass through.

7. The adjustable steering column clamping mechanism according to claim 1, wherein one bolt has a left-hand thread and the other bolt has a right-hand thread.

8. An adjustable steering column clamping mechanism comprising:

a steering column support bracket having two opposed slots therein, the steering column support bracket has two flanks extending on either side of a steering column tube, one steering column support bracket slot being positioned in each steering column support bracket flank;

an adjustment bracket connected to the steering column tube, the adjustment bracket has two flanks extending on either side of the steering column tube, the adjustment bracket having two slots therein, the slots being positioned proximate radially opposing portions of the steering column tube, one adjustment bracket slot being positioned in each adjustment bracket flank;

a clamping mechanism operating handle having two bolt engaging portions extending therefrom; and two bolts, one bolt slidably engaging one adjustment bracket slot, extending through one steering column support bracket slot and threadedly engaging one clamping mechanism operating handle bolt engaging portion, the other bolt slidably engaging the other adjustment bracket slot, extending through the other steering column support bracket slot and threadedly engaging the other clamping mechanism operating handle bolt engaging portion;

the clamping mechanism operating handle being operable from a clamped condition wherein the steering column support bracket is clamped between the adjustment bracket and the bolt engaging portions of the clamping mechanism operating handle, to an unclamped condition wherein the steering column support bracket is moveable relative to the adjustment bracket and the bolt engaging portions of the clamping mechanism operating handle;

the steering column support bracket flanks being positioned between the adjustment bracket flanks and the clamping mechanism operating handle bolt engaging portions.

9. An adjustable vehicle steering column clamping mechanism including a steering column support bracket with two flanks for extending either side of a steering column outer tube, each flank incorporating a slot for adjustment of a steering column in a rake direction, and a reach adjustment bracket means arranged to be joined to the steering column outer tube, the reach adjustment bracket means having two flanks for extending either side of the steering column outer tube, each flank of the reach adjustment bracket incorporating a slot for adjustment of the steering column in the reach direction; there being a clamping mechanism operating handle with parts extending to embrace the flanks on both sides of the steering column outer tube, and threaded bolts and associated clamping members on the bolts rotatable by said operating handle parts; one of the bolts extending through the slots in the flanks of the two brackets on one side of the steering column outer tube and the other bolt extending through the slots of the two brackets on the other side of the steering column outer tube; the arrangement being such that rotation of the handle in one direction moves said parts in a direction to clamp the brackets and steering column outer tube and rotation of the handle in the opposite direction moves said parts in a direction to release the brackets and steering column outer tube, thereby to facilitate adjustment of the steering column.

10. The clamping mechanism according to claim 9, wherein the respective flanks of the steering column support bracket extend outside the flanks of the reach adjustment bracket means.

11. The clamping mechanism according to claim 9, wherein the bracket means which has the innermost flanks is spaced from the steering column outer tube so that a head of each bolt can lie between the inner side of the respective innermost flank and the outer side of the steering column outer tube.

12. The clamping mechanism according to claim 9, wherein each slot opens to an end of the flank.

13. The clamping mechanism according to claim 12, wherein each slot opens to the end of the flank that is remote, in use, from the steering wheel.

14. The clamping mechanism according to claim 9, wherein the slots in the flanks of the reach adjustment bracket means are provided with a keyhole portion through which the head of a respective bolt can pass so as to be located on the inner side of the flank.

15. The clamping mechanism according to claim 9, wherein one bolt is given a left-hand thread and the other bolt is given a right-hand thread.

16. The clamping mechanism according to claim 15, wherein the threads are multi-start threads.

17. A clamping mechanism according claim 9, wherein the reach adjustment bracket means is in two parts, each part being joined to the steering column outer tube.

18. A vehicle steering column according to claim 9, wherein the bolts of the clamping mechanism are located on a substantially on-center line passing at right angles through the axis of the steering column outer tube on either side thereof, respectively.

* * * * *